July 30, 1968    P. L. TERRY ET AL    3,395,047
GASKETED ELECTRODE FUEL CELL
Filed Aug. 30, 1965    4 Sheets-Sheet 1

Inventors
Peter L. Terry
Leslie L. Randall
By their Attorney

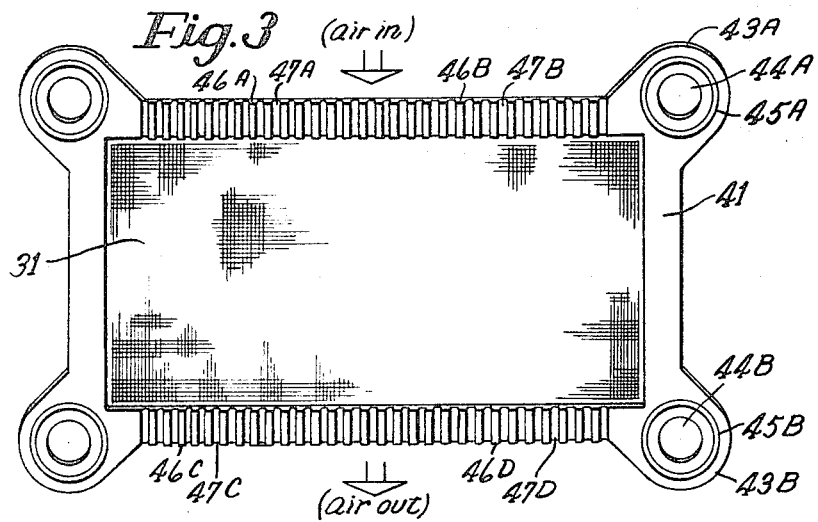
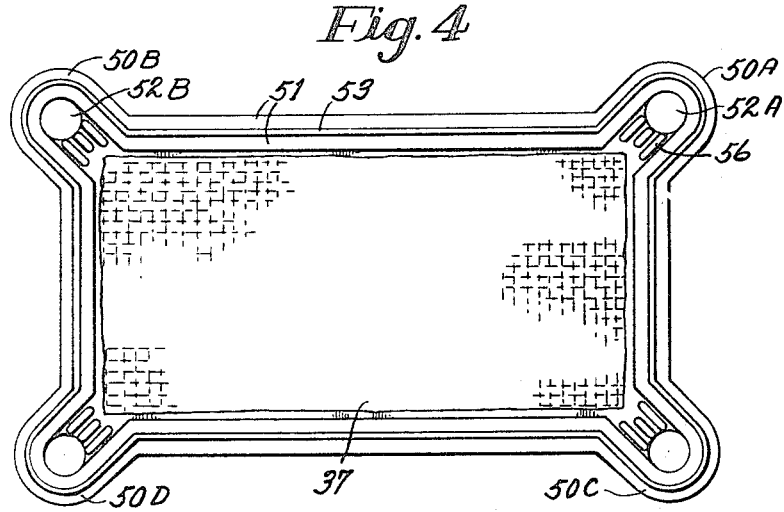
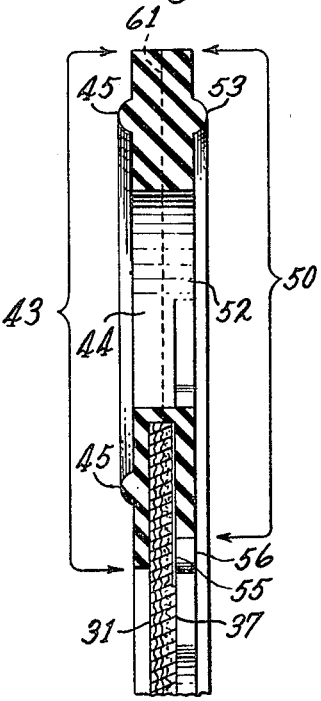
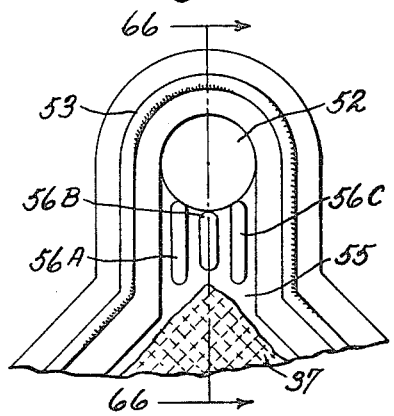

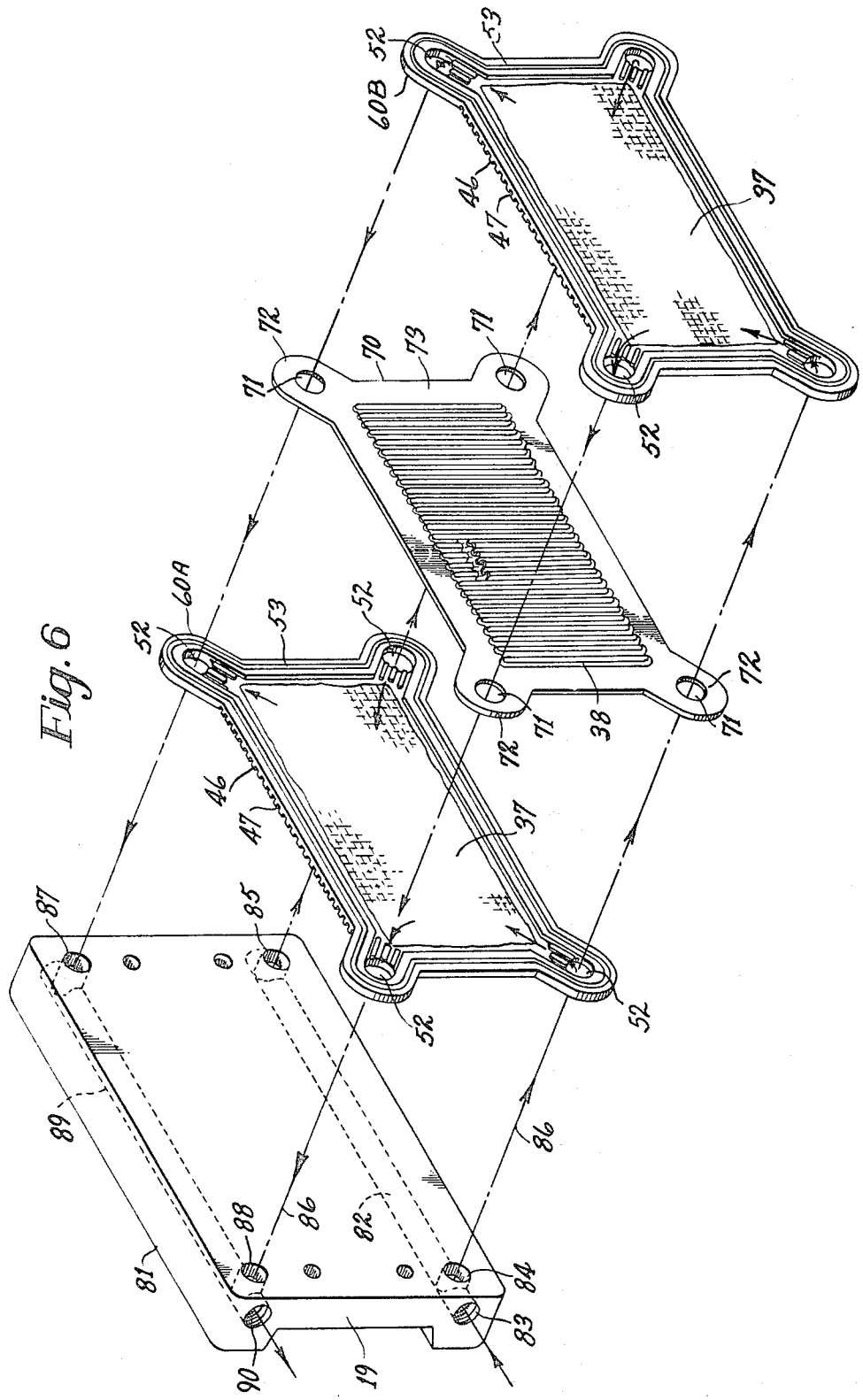

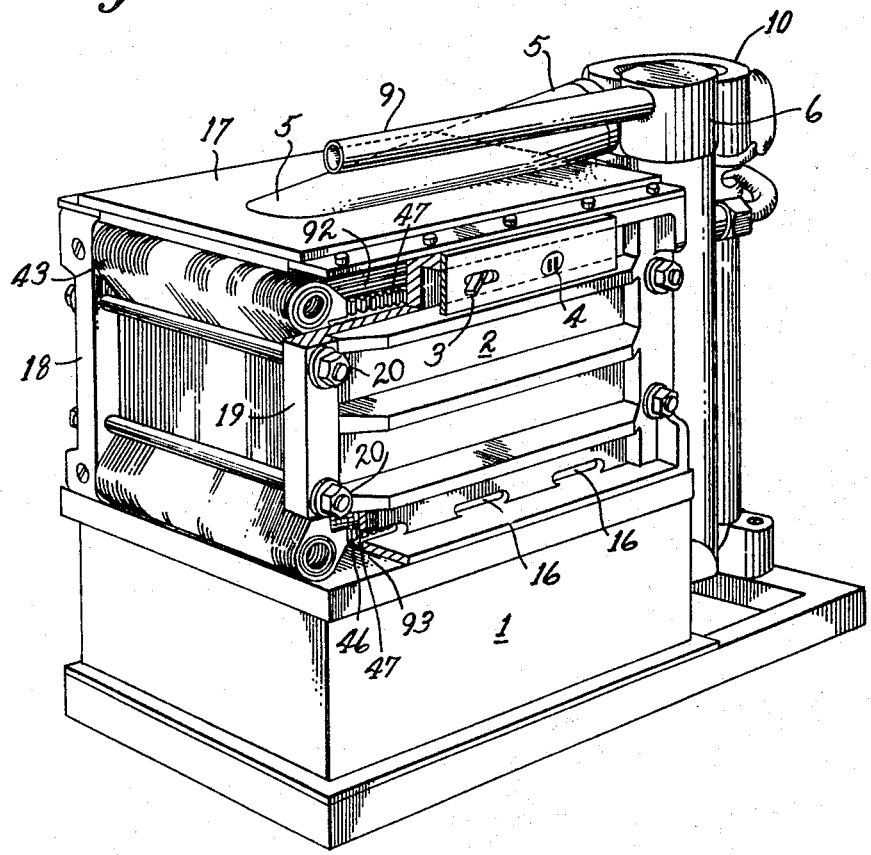

United States Patent Office 3,395,047
Patented July 30, 1968

3,395,047
GASKETED ELECTRODE FUEL CELL
Peter L. Terry, Melrose, and Leslie L. Randall, West Hanover, Mass., assignors to Monsanto Research Corporation, St. Louis, Mo., a corporation of Delaware
Filed Aug. 30, 1965, Ser. No. 483,472
6 Claims. (Cl. 136—86)

This invention relates to a fuel cell, and more particularly, to a fuel cell including an advantageous gasketed electrode assembly, and to the stated gasketed electrode assembly.

Much of the work done on fuel cells has been directed to utilization of hydrogen and oxygen as the cell feedstocks. These gaseous fuels present rather different design problems than do cells using a liquid feed.

Hydrazine cells can be used with a liquid feedstock, by dissolving the hydrazine in an electrolyte such as aqueous KOH. With an effective air electrode, this provides a highly useful fuel cell system, superior to other cell systems such as $H_2/O_2$.

An $H_2/O_2$ cell has to include separate tankage for the hydrogen, aside from the electrolyte, and this is inconvenient: either compressed gaseous hydrogen or cryogenically stored liquid hydrogen is used, which requires heavy and/or bulky tanks, or the hydrogen is generated chemically as needed, requiring storage of separate reactants to produce the generated hydrogen.

A liquid electrolyte, as used in the present cells, is preferred to an ion exchange membrane separator, because the internal resistance of the cell is lower. With a $H_2/O_2$ cell, separate tankage and pumping has to be provided for a circulating liquid electrolyte system.

Moreover, $H_2/O_2$ cells produce water as an electrochemical reaction product and have water control problems at the separator, particularly when this is an ion exchange membrane. It is generally the air (oxygen) stream which removes the water produced by electrochemical reaction in these cells. An ion exchange membrane has to be kept somewhat wet, to keep it from becoming brittle. Because the air stream tends to dry it out, special wicking devices have to be used to keep the membrane moist. A complicating factor is that air flow is used for cooling in these cells, and obviously the air flow rate cannot be unrestricted, since there are the water removal rate problems noted above.

Accordingly, cell designs and components adopted for use with such prior art fuel cells are not adapted or conveniently suited to use with a hydrazine-KOH anolyte and air used as the oxidant.

It is an object of this invention to provide a novel fuel cell construction.

A particular object is to provide a novel fuel cell construction adaptable to use of an alkaline hydrazine aqueous feedstock with air as the oxidant.

Another object is to provide a novel gasketed electrode assembly.

These and other objects will become evident from the following specification and claims.

The presently provided fuel cell construction is illustrated in the figures, in which:

FIGURE 3 is a front elevational view of the cathode side of the gasketed electrode assembly;

FIGURE 4 is a front elevational view of the anode side of the gasketed electrode assembly;

FIGURE 4A is a detailed enlargement of the extension area of the gasketed anode side of the electrode assembly;

FIGURE 5 is a cross-section along lines 66—66 of the gasketed assembly extension area shown in FIGURE 4A;

FIGURE 6 is a perspective exploded view of the anolyte distributing end plate, gasketed electrode assemblies and physical separator; and FIGURE 7 is a front perspective, partially broken-away view of the assembled fuel cell.

Figure 1:
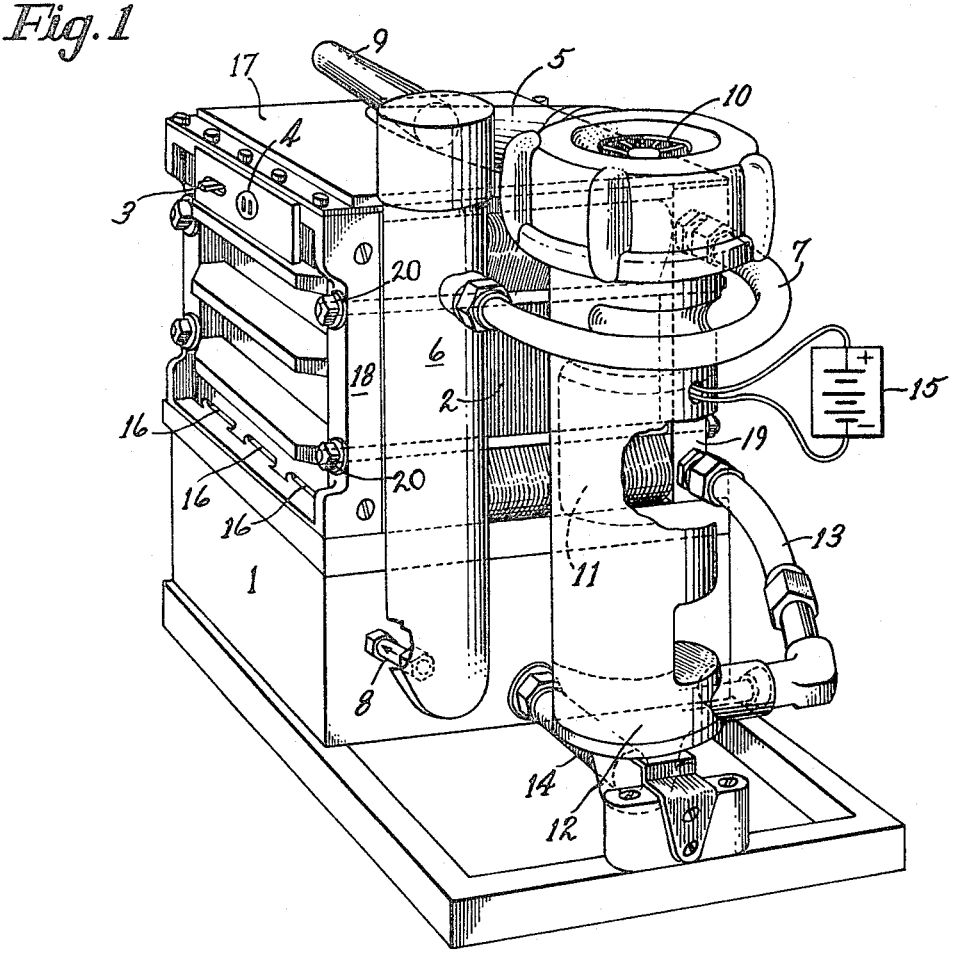
FIGURE 1 is a rear perspective, partially schematic view of the assembled fuel cell.

Briefly, the construction of the cell, as shown in FIGURE 1, which is a rear perspective, partially schematic view, includes a tank 1 for storage of the aqueous alkaline hydrazine solution, a vertical electrode stack 2 enclosed between end plates 18 and 19, a switch 3 and an outlet plug 4. A motor 11 drives a pump 12 and a centrifugal air blower 10, in the invention as illustrated in the figure. The motor is connected to an auxiliary starter battery 15; once it is started, the motor 11 is driven with power tapped from the electrode stack (by leads not shown). The pump 12 and air blower 10 may each have separate motors, in which case each is connected to the starter battery, and to the electrode stack. The pump 12 draws the hydrazine solution from the tank 1 through a conduit 14 and feeds it into the bottom of the electrode stack through a conduit 13. The hydrazine solution rises in the anode compartments within the electrode stack and exits into riser 6 through conduit 7. The hydrazine forms nitrogen as it is consumed electrochemically, and this is vented through conduit 9 to the atmosphere, while the liquid anolyte returns through riser 6 to tank 1 through conduit 8 for recirculation. The centrifugal air blower 10 draws air from the atmosphere and blows it over the inside of the electrode stack through conduit 5. Air exit ports 16, 16 across the side of the end plate 18 provide a path by which the air drawn in by the blower 10 exits from the electrode stack. The gasketed electrode assembly shape having protruding extensions as described hereinafter provides an air manifolding path beneath the cover 17 of the electrode stack by which air is distributed to the cathode compartments of the electrode stack, and also an air exhaust manifolding path at the bottom of the electrode stack, whereby the air exhaust can exit from the stack at air ports 16, 16. Bolts 20, 20 hold the electrode stack and end plates together.

References herein to the present cell or the present fuel cell are generally intended to refer to the assembly illustrated in FIGURE 1. That more than one individual electrochemical cell is included in the electrode stack actually makes this electrochemical energy conversion system a battery. However, as is conventional in the art, the system is called a fuel "cell."

The operation of the cell illustrated in FIGURE 1 will be understood from the following description.

The present cell uses a gasketed electrode assembly including a water-proof cathode, a sorbent anode and a sorbent electrolyte separator. By an electrolyte separator is meant an electronically insulating material which will absorb and retain liquid electrolyte, such as an asbestos mat. The gasketed electrode assemblies are separated in the electrode stack by physical separators, which coact with the gasketing to form anode compartments and cathode compartments.

As further explained hereinafter, the hydrazine alkaline anolyte solution is pumped into the anode compartments. Since the anode is sorbent, this solution penetrates the anode and wets the sorbent electrolyte separator in each anode compartment. Thus the aqueous alkali anolyte acting as electrolyte reaches the electrolyte separator, and penetrates through it as far as the cathode. The cathode being water-proof, however, the solution penetrates no further.

Air is blown down through the cathode compartments. The cathode, while water-proof, is porous to gas. The air can thus reach the electrolyte in the electrolyte separator, upon entering each cathode compartment formed by the juxtaposition of a physical separator and the cathode face of a gasketed electrode assembly.

As is known, the electrochemical reaction of a fuel cell takes place at the electrode/electrolyte interface. (More accurately, it takes place at the electrode catalyst interface with the electrolyte; however, the catalytic area is regarded as part of the electrode.) Access being provided for the fuel, hydrazine, and the oxidant, air, to the electrolyte in the electrolyte separator, the electrochemical reaction takes place at the interfaces between this separator and the electrodes. The reaction of hydrazine forms nitrogen (removed by being vented as indicated above) and hydrogen ions; that of oxygen (air) forms hydroxyl ions, and the product of these ions is water, which is vented as indicated hereinafter.

This system has advantages not possessed by other air (or oxygen) fuel cells.

In the present cell, the air goes past a water-proof electrode, so the water produced by the electrochemical reaction is generally kept on the electrolyte side of the air electrode, penetrating it only as a vapor. Thus the air flow rate which can be used is high and suitable for cooling, in contrast to the limitations of the $H_2/O_2$ cell in this respect. Since the electrolyte separator is kept wet by the flowing fuel-electrolyte (anolyte) solution, in this system, there is no danger of the separator being dried out by the air flow. It is simple, if desired, to make use of the electrolyte-diluting water produced in the reaction, by adding solid alkali to the anolyte to make more electrolyte. For long-term use, of course, bleed lines can then be provided to take care of a gradually increasing volume of the electrolyte, or provision can be made to evaporate off the water of reaction, and so forth. Also for long-term use, provision will be made for replenishing the anolyte with fuel, e.g., hydrazine.

The cell construction and gasketed electrode assembly described herein are particularly advantageously employed with a hydrazine/KOH/air feedstock system. The hydrazine decomposes to nitrogen, which provides a gas lift to the anolyte feed which is innocuous to a KOH electrolyte, and aqueous KOH is a convenient electrolyte. However, other aqueous anolytes can also be used with such an electrode assembly and cell construction with air as the oxidant. Ammonia, for example, is an electrochemical fuel soluble in aqueous alkaline electrolytes to provide electrochemical reaction products like those produced by hydrazine. Methanol decomposes to $CO_2$ electrochemically, with suitably catalytic electrodes, also providing a gas lift to the anolyte in the electrode stack. Carbon dioxide is harmful to aqueous KOH, NaOH or like alkali metal hydroxide electrolytes, but aqueous alkali metal carbonates such as potassium or sodium carbonate, which are not $CO_2$-sensitive, can if desired be used as the electrolyte, with either methanol or hydrazine.

Figure 2:
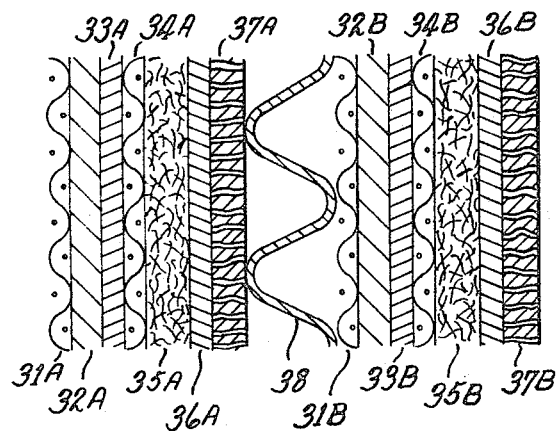
FIGURE 2 is an enlarged and schematic cross-sectional detail of the electrode stack construction.

Referring now to the electrode in further detail, a cross-section of a preferred electrode construction and a preferred physical separator construction are shown in FIGURE 2. This is an enlarged and schematic cross-sectional detail of the electrode stack construction shown in subsequent figures, in which 31–37A and 31–37B are two separate electrode assemblies, and 38 is a single physical separator between the two. The scale in this figure is exaggerated, for clarity; for example, the catalytic layers may actually be a tenth to a hundredth of the thickness of the separator, or even less. In the figure, 31A and 31B are screens (included for support purposes, chiefly). 32A and 32B are water-proof porous membranes. They are preferably made of hydrophobic conductive carbon (or graphite) mixed with a dispersion of a water-proofing binder such as an aqueous polytetrafluoroethylene dispersion and dried. Layers 33A and 33B are catalyst layers. They are preferably made by mixing a catalyst such as platinum black with a binder such as an aqueous polytetrafluoroethylene dispersion, and applying it to the water-proofing carbon membrane layer. 34A and 34B are again screens, which support and hold together the waterproof catalyzed cathode structure; these screens can, if desired, be located within the catalyst layer or between this and the water-proofing layer. The carbon-and-catalyst polymer-bonded structure forming the cathode is preferably the laminar membrane electrode structure described in more detail hereinafter; other porous, water-proof electrodes may be used if desired, but this laminar electrode is especially active in the present system and preferred.

35A and 35B are sorbent electrolyte separators such as an alkali-resistant, sorbent, porous non-conductive material like an asbestos felt. 36A and 36B are catalytic layers, made of a material catalytic for hydrazine electrochemical utilization such as a palladium black, and 37A and 37B are sorbent porous electrode membranes or plaques, such as a porous nickel plaque, through which the alkaline hydrazine solution can pass to reach the electrolyte separator. 38 is a physical separator; as shown, it is a corrugated structure, which contacts alternately the anode and the cathode external surfaces, thus short-circuiting one to the next when the separator is a conductive material, such as a metal like nickel, for example, as is perferably the case. It can alternatively have projecting ribs, prongs or other projections, or even be smooth, its chief function being to keep the anode and cathode surfaces each separated from direct physical contact with one another, and to coact with the gasketed electrode assemblies to provide a cathode compartment through which the air can pass and an anode compartment through which the hydrazine solution can travel (at right angles to the plane of the section illustrated). The advantage of a conductive separator having projections such as corrugations contacting the electrodes on either side is that it picks up current from each such electrode, transmitting it so that the current can be tapped from it or from the cell end plates, and connecting the cells in series, so that the total voltage of a series of cells can be collected. Such conductive separators also are more efficient current collectors than tab connectors to each individual electrode. However, if desired, the separator can be non-conductive, and external taps be connected to the electrodes (protruding through the gasketing, for example) to connect the electrodes as desired in series or in parallel, to provide increased voltage or amperage as desired. Also, the separator can be laminar, consisting of conducting outer layers insulated from each other by a non-conducting central layer with external electrical connections being made by tabs to the outer, conductive layers.

While the figures of the present application do not illustrate it, the switch 3 shown in FIGURE 1 can be arranged to tap selectively all or a portion of the cells in a unit, or to pick up connections from individual cells which are not short-circuited by conductive physical separators as just mentioned, but insulated by non-conductive physical separators and individually tapped, to draw current in series or parallel. The circuitry of such connection and tapping is well known in the art. Also, there can be more than one plug (4 in FIGURE 1), to permit operating two 12-volt appliances from one 24-volt cell, and so forth.

Proceeding now to a consideration of the gasketed electrode assembly of this invention, the present gasketed electrode assemblies have raised gasketing surrounding the electrode faces on both sides, each comprising a gasket border framing the electrode face, and hole-pierced gasket extensions protruding outwardly from the electrode borders at spaced intervals. By a gasket border framing the electrode face is meant gasketing which covers the electrode face edges, either surrounding the face completely (cathode face) or covering the electrode face edges only between the gasket extensions (anode face). The gasketing on either side as a whole, including its border portions and its extension portions, surrounds each electrode face completely, and is substantially coextensive on either side.

As explained hereinafter, the stated extensions coact with an electrode stack cover and with the surface on which the electrode stack rests to provide plenum chambers for air intake manifolding and exhaust air venting. The holes in the extensions provide anolyte feed and return channels in the cell stack. The gasketing on the cathode face is shaped to permit air intake and venting, and to exclude anolyte at the cathode face, and the gasketing on the anode face is shaped to permit anolyte entry and exit, but exclude air, at the anode face, when the gasketed electrode assemblies are assembled with the physical separators in the cell stack.

FIGURE 3 shows a front elevational view of the cathode side of the gasketed assembly. In this figure, showing the gasketed assembly cathode face, 41 is the raised border formed by the gasketing material around the screen cathode face 31. (This is the same screen 31 as the screen 31A and 31B of FIGURE 3.) The gasket border 41 completely surrounds the cathode face 31. Recesses 47A, 47B, etc. in the raised gasket border 41 provide passageways between the gasket border edge and the cathode face. The intervening portions of the border between the recesses form ridges 46A, 46B, etc. These recesses 47 provide passageways for access of air (entering in the same plane as that illustrated) to the cathode face. Similar recesses 47C, 47D, etc. in the opposite side of the raised gasket border 41, between ridges 46C, 46D, etc., provide egress for exiting, oxygen-depleted air (again moving in the same plane as that illustrated: arrows above and below the gasketed assembly indicate the air flow direction). The raised gasket border 41 and the ridges 46 press against the physical separator in the electrode stack, while the recesses 47 do not contact the physical separator and thus provide air flow openings into the cathode compartment formed by pressing the cathode side of each gasketed assembly against the adjacent separator.

In addition to the cathode face border, the cathode gasketing includes extensions 43A, 43B, and so forth, pierced by holes 44A, 44B, etc. It will be seen that the holes in the gasket extensions are separated from the cathode face by the fact that the gasket cathode border 41 surrounds the cathode face completely, intervening between it and the holes set off from the cathode border, in the protruding extensions; and the recesses 47 in the border 41 are located between but not in front of the extensions. Moreover, the holes in turn are surrounded by an O-ring ridge (45A, 45B, etc.), which forms a seal with the physical separator pressed against the gasket face in the electrode stack. Thus, anolyte flowing through the holes 44A, 44B, etc. in the electrode stack does not penetrate into the cathode compartment formed by the juxtaposition of the illustrated cathode side of the gasketed electrode assembly and the adjacent physical separator.

Turning now to FIGURE 4, this is an elevational view of the anode side of the gasketed electrode assembly. The raised gasketing includes a border 51 enclosing the edges of the anode face 37 (same as porous anode 37 in FIGURE 4) and hole-pierced extensions 50A, 50B, etc. The gasket border 51 covers the porous anode face edges only between the gasket extensions. Since the raised anode gasketing thus surrounds the holes 52A, 52B, 52C, 52D only externally, and does not cover the anode face in front of the extensions, a flow path (interrupted by supporting and manifolding ridges 56) is thus provided from the holes 52A, 52B, etc., to anode face 37. The anode gasketing has a ridge 53 which completely and continuously surrounds the periphery of the anode gasketing, which forms a seal with the adjacent physical separator in the electrode stack, providing an anode chamber enclosed to access except through the holes 52, 52 in the extensions 50, 50.

A detailed enlargement of the extension area of the gasketing on this side is shown in FIGURE 4A, from which it will be seen that the anode face in front of hole 52 is covered by a thin layer 55 of water-proofing insulating material, preferably the same material as is used for the gasketing material. Within the covered area in front of the holes are ridges 56A, 56B, 56C which act as supports to hold the physical separator away from the gasketed electrode assembly in the cell stack and also as manifolding means to direct flow of liquid between the hole 52 and the cathode face 37.

FIGURE 5 is a cross-section of the gasketed assembly shown in FIGURE 4A, along line 66—66, in which 43 is the gasketing extension on the cathode side with a ridge 45, 45 surrounding the hole 44, and 31 is the cathode face. 50 is the gasketing extension on the anode side with a ridge 53 running around the periphery of the gasket outside the hole 52. As illustrated, this is a unitary gasket, and holes 44 and 52 are the same hole, but it will be appreciated that if desired, two individual gaskets could be used to make the gasketed electrode assembly, joining at dotted line 61; however, a better seal to the electrode assembly is obtained if the gasket is molded onto it in one piece. 56 is a supporting and manifolding ridge on the water-proofed surface 55 at the corner of the porous anode 37.

FIGURE 6 provides a perspective exploded view of the anolyte distributing end plate 19 (same as end plate 19 in FIG. 1), gasketed electrode assemblies 60A, 60B, and physical separator 70.

Separator 70 is of the same shape and size as the gasketed electrode assembly 60. The separator has holes 71, 71, penetrating through its extensions 72, 72 to align with the holes in the gasketed assemblies. Throughout the center portion, the separator 70 contains corrugations 38 which project outwardly (as illustrated in cross-section as 38 in FIGURE 3) to contact the anode and cathode on either side, thus shorting one anode to the next cathode (see cross-section in partially broken-away section).

In this perspective exploded view, only anode faces 37, 37 are visible, while the cathode faces of the gasketed assemblies 60A, 60B are not visible. The cathode face which would contact separator 70 is on the back side of gasketed electrode assembly 60B, not visible in this figure except for the ridges 46 of the anode side gasketing. If the view in the figure were in the opposite direction, the cathode faces of the gasketed electrode assemblies would be seen, but the separator would appear substantially the same; its two faces are identical in appearance, except that the endmost corrugations are each convex on one face, and correspondingly concave on the other. This simplifies construction of the separator 70, which can be prepared with a corrugated center by deforming the center portion in symmetrical corrugations. As will be seen from the present figure, the corrugations in separator 70 are shaped to fit inside of the raised gasketing and to contact the respective electrodes on either side thereof. The separators are positioned in the cell stack so that convex corrugations face each other, to equalize the pressure exerted by the separators on either side of an electrode assembly. A planar border, 73, forms the periphery of the separator, around the corrugations, and the hole-pierced extensions are also planar, so that the physical separator contacts the gasketing of the gasketed assembly on either side forming a tight seal, which runs completely around the gasket cathode face at ridge 53 and runs around the holes in the anode face (ridge 45 in FIGURE 4).

FIGURE 6 also shows the anolyte end plate 19 and indicates the flow path of the liquid anolyte (mixture of aqueous KOH and hydrazine) as the arrowed anolyte flow path 86. The distribution channel 82 in the end plate 19 includes an entrance port 83 and exit ports 84 and 85. The anolyte entering the distribution channel 82 at entrance port 83 partly exits through port 84, while part continues flowing through the distribution channel 82 to exit through port 85. Thus the anode faces of the gasketed electrode assemblies such as 60A and 60B are provided with an anolyte flow entering from both sides of the anode face 37 through holes 52, 52. Entry from both sides promotes even anolyte distribution on the anode faces. The corrugated portion 38 of physical separator 70 also helps to distribute the anolyte evenly over the entire face 37 of the anode: anolyte flows below the corrugations and up within the channels of the corrugations.

As the arrowed indication of the anolyte flow 86, 86 shows, part of the anolyte enters each anode compartment, as it flows through the electrode stack to its end. In the anode compartments, the anolyte flows upwardly over the anode face 37 to the upper corner holes 52, 52 and flows back through the tubes formed by these upper holes in the stack of gasketed electrode assemblies and separators to exit ports 87 and 88, which port through the end plate 19 to distribution channel 89 leading to end plate exit port 90. From this port 90, the exhausted anolyte returns, by means (not shown here, but shown in FIGURE 1) venting the nitrogen byproduct, some water vapor and the like, to the anolyte tank (not shown in this figure). The double entrance and double exit ports, together with the channels in the physical separator plate 70, ensure a desirable complete coverage of the anode face by fresh anolyte.

FIGURE 7 is a front perspective, partially broken away view of the electrode stack, tank, and over-all fuel cell, which shows the advantageous properties of the gasketed electrode assembly including gasketing electrode borders and outwardly-projecting, hole-pierced extensions from the borders. As shown, the bolts 20, 20 holding the ported cathode end plate 18 and anolyte flow end plate 19 together run along the outside of the indented side of the electrode stack, above and below the extensions of the gasketed electrode assemblies and of the physical separators. The cell being open on this side provides cooling for the electrode stack, in addition to that provided by the air flow.

Centrifugal air blower 10 draws in air from the ambient atmosphere which is forced through conduit 5 leading under electrode stack cover 17. Stack cover 17 contacts the extensions protruding outwardly from the borders of the gasketed electrode assemblies and physical separators. Since the borders of these electrode stack elements are indented between the protruding extensions, a plenum chamber 92 for air distribution is thus defined by the top cover 17, the borders of the electrode stack elements and their protruding extensions. The indrawn air goes down the recesses 47 on the cathode sides of the gasketed electrode assemblies, reaching the cathode compartments formed by juxtaposition of these cathode faces with the physical separators adjacent thereto. The exhaust air then exits through similar recesses 47 between ridges 46 on the bottom of the cathode side of the electrode assemblies. The indentations between the extensions on the gasketed electrode assemblies and on the physical separators form a space which, together with the surface on which the stack rests, such as an electrode stack tray (not shown) covering the top surface of the anolyte tank 1, forms a plenum chamber 93 for exhaust air collection, from which the exhaust air can exit through ports 16, 16.

While the presence of exposed electrode sides and bolts of the electrode stack is obscured in FIGURE 1 by the positioning of riser 6, air blower 10, motor 11, and so forth at this end of the electrode stack, it will be evident that the stack is also open to the atmosphere on this end for air cooling, and that the indentations between the extensions of the gasketed electrode assemblies and physical separators permit passage of bolts outside the sides of the electrode stack at this end also.

Having the gasketed electrode assembly and physical separator corner extensions protruding angularly from the borders of these components as illustrated is desirable, as will be evident from the above discussion of FIGURE 7, since it provides indented edges on all four sides. The extensions may, however, protrude in a direction parallel with the border edges, provided that this direction parallels that of the air manifolding recesses on the cathode gasket face; with appropriate arrangements made for clamping the cell stack together, air distribution plenum chambers will also be formed between the extensions under the electrode stack cover and below the electrode stack. Moreover, the grooved (ridged and recessed) portions of the cathode face gasket border may be on the sides, instead of the top and bottom, with the cover plate and air intake blower mounted on one side of the electrode stack; air venting can then take place directly to the atmosphere, without interposition of a vented cover, at the opposite side of the stack. Indeed, any two or all four cathode-framing gasket edges can be grooved to permit air passage, if desired, those being used for air intake preferably being provided with cover plates to manifold the air supply in a plenum chamber. The shape of the gasket-framed electrode area need not be rectangular, but the edges may be concave instead of straight, and so forth.

In construction of a cell as provided by this invention, the cathode is produced by applying a catalytic surface layer to a water-proof conductive layer, and preferably, supporting at least one, and desirably both, of the surfaces of this laminar electrode on a screen or mesh of conductive material. Provision of the water-proof conductive layer is preferably effected by mixing a hydrophobic particulate conductive electrode material with a dispersion of a polymer to form a viscoelastic dough which is spread to form a membrane without substantially changing the liquid content of the viscoelastic dough, and heating the membrane to cure it. The stated hydrophobic conductive material is desirably a hydrophobic carbon black, and the dispersion of a polymer is desirably a dispersion of a fluorocarbon polymer like polytetrafluoroethylene in a dispersion medium which is at least partially organic. Provision of the catalytic surface layer on this water-proof layer is preferably effected by mixing a particulate catalytic material like platinum, with or without suitable fillers, extenders or promoters, with a dispersion of a polymer like an aqueous polytetrafluoroethylene dispersion to form a viscoelastic dough, which is spread into a membrane without substantial change in the liquid content of this membrane. This membrane is pressed onto the surface of the above-described membrane comprising a hydrophobic conductive material, again without substantial change in the liquid content of the membrane, to form an intimately bonded laminate of the membrane. Supporting conductive foraminous structures such as metal screening or the like are pressed into the surfaces of these membranes, and then the assembly is cured by heating. It is sometimes desirable to cure one or more membrane-including lamina separately, and subsequently bond this to one or more membrane-including lamina by bonding, pressing and curing operations to form the complete laminar structure. While it is customary to cure polytetrafluoroethylene structures by heating under pressures such as 100–1000 p.s.i.g., to sinter the polymer, the stated cure of the laminar membrane electrodes by heating is desirably conducted at atmospheric pressure or below; this avoids expressing liquid from the membrane doughs and produces a structure in which the porosity appears to correspond to the space occupied by the liquid content of the dough prior to curing, whereas heating under pressure appears to collapse the pore structure of the membranes, reducing their porosity. Heating at atmospheric pressure, preferably gradual heating, to temperatures such as about 300° C., produces well-bonded structures of good mechanical strength, it has been found.

The stated procedure for making laminar membrane electrodes is described in more detail in the copending application of Max C. Deibert, S.N. 435,936, filed Mar.

1, 1965, assigned to the same assignee as the present invention. It is illustrated by the following exemplary description of preparation of laminar membrane electrodes, 3.25 x 6 inches oblongs, which are a laminate of a carbon membrane with a platinum membrane, having a supporting screen pressed into each membrane surface. While the procedure described is a manual one, machine methods may alternatively be used.

For the carbon membrane preparation, a diluted dispersion is prepared by adding 6.5 cc. of 100% isopropanol and then 6.5 cc. of benzene to 8 cc. of an aqueous dispersion of polytetrafluoroethylene. The aqueous dispersion of polymer employed is a dispersion of polytetrafluoroethylene ("Teflon" dispersion 852–201), which is believed to be an emulsion as described in U.S. Patent 2,613,193, containing about 5%, by weight of the total, toluene, about 2%, by weight of the total, of surfactants such as lauryl sulfate and an alkylaryl polyalkylene oxide ether, the remainder being the polymer and water, in approximately a 1:1 weight ratio. The average polymer particle size in this emulsion is reputedly about 0.2 micron.

Addition of this diluted dispersion to 4 g. of Shawinigan carbon black, which is conductive acetylene black with a particle size of about 0.04 micron, is followed by stirring vigorously for several minutes and then grinding the mixture in a mortar and pestle for about 5 minutes, when it has become a coherent rubbery dough. The dough is placed between polypropylene sheets and spread with a cylindrical roller into a membrane of about 30 square inch surface area. The top sheet is lifted, and the rolled-out material is folded together into a small pile, after which the sheet is replaced and the mixture is rolled out again. This is folded into a lump and rolled out again, the folding and rolling-out operation being repeated 4 or 5 times, until the viscoelastic dough has become stiff. The viscoelastic dough is rolled out into an oblong membrane about 4 by 7 inches and 15–20 mils thick.

To prepare the platinum membrane, with an electrode platinum loading of about 7 mg. pt./cm.$^2$, the amounts used to make a membrane 3.25 x 6 inches are 0.2 g. of the above-described polytetrafluoroethylene dispersion, 1.0 g. of water, and 1.0 g. of Englehard platinum black (particle size about 0.01 micron). An additional 0.2 g. of graphite is included with the platinum mixture. A mixture of these ingredients, in the stated proportions, is stirred for 3–5 minutes, until it has agglomerated into a rubbery, viscoelastic dough which, in contrast to the initial loose paste, coheres together rather than wetting the walls of the glass vial in which it is mixed. This dough is then rolled out repeatedly to subject it to shearing stress and homogenize it, providing a 3 x 6 inch membrane.

The carbon and the platinum membranes are then pressed together, and then the platinum side of the assembly is covered by a silver expanded metal screen measuring 3¼ x 6 inches, and the screen is rolled into the membrane assembly, by rolling pressure applied with the membrane layers and screen enclosed between sheets of polypropylene film. The assembly is air-dried for 16–24 hours, and then cured by heating for a half-hour at about 80° C., an hour at 150–155° C. in a nitrogen atmosphere under vacuum (a nominal 10 torr), and an hour at 300° C. at atmospheric pressure.

To provide sorbent anodes to be used with the cathodes prepared as described above, there may be employed, for example, porous nickel plaques such as those used in nickel (e.g., Ni-Cd) batteries, which may be 20–30 mils thick, for example, coated with a surface catalytic for hydrazine electrochemical consumption, such as palladium. For example, an aqueous, slightly acid (HCl) solution of $PdCl_2$ may be continuously circulated through a porous nickel plaque, mounted in a holder which seals the edges from contact with the solution, until the surface nickel has been replaced by palladium, forming a coating of about 10 mg. Pd/in.$^2$, for example. Other procedures may be used if desired to effect the plating, such as electroplating. Methods for making these porous plaques and for plating the surface thereof with catalysts are well known to the art. Other alkali-resistant, catalytic and electrolyte-sorbent electrode structures may be employed if desired. The anode will be of about the same size as the cathode: for example, about 3.25 x 6 inches.

The catalyst-coated side of the anode is now placed against one face of a sorbent separator and the catalyst-coated (non-hydrophobic) face of the cathode against the other face of the sorbent separator. The sorbent separator material may be any of a wide variety of materials which are alkali-resistant and non-conductive, and which absorb aqueous liquids such as the anolyte feed of the present cells. A mat of asbestos fibers is particularly suitable, but it may be a mat or felt of fibers of any non-electronically-conductive, alkali-resistant material, such as polypropylene, nylon or the like, which has openings sufficiently large to permit ready passage of aqueous liquid therethrough. The thickness may be varied, but is preferably about ¼ inch or less, to minimize internal resistance in the cells, and the length and width of the sorbent separator sheet will be approximately those of the anode and cathode.

The external cathode face of the anode/separator/cathode assembly is covered by a nickel expanded metal screen and combined with gasketing of the configuration described above, having hole-pierced extensions protruding outwardly from the electrode face border. As noted above, the anode face at the corners in front of the extensions of the gasket is coated with a water-proof material on which are positioned ridges that prevent the physical separators from being crushed down flat onto the face of the anode when the electrode stack is pressed together tightly. This water-proof material may be the same as the gasketing material. This coating on the anode face and ridges may be applied separately, or in conjunction with application of the gasketing material to the electrode assembly. The gasketing is preferably molded into the electrode assembly, which provides a tighter seal between the two than compressing the electrode assembly between separate anode and cathode side gaskets. The gasketing material extends over the edges of the electrode assembly so that the electrode faces are recessed within the gasketing border.

Useful gasketing materials are water-proof, resilient and alkali-resistant materials such as synthetic rubbers. Exemplary of such materials are, for example, terpolymers of ethylene, propylene and a minor amount of a third component providing residual unsaturation, which are cured (cross-linked) by adding a cross-linking agent such as a peroxide, and heating under pressure. Other alternatives are a butylene-butadiene copolymer containing less than 5 mole percent butadiene, which is cured similarly to the ethylene-propylene elastomers, stereo-regular cis-polyisoprene, and so forth.

An assembled electrode stack consists of a number of such gasketed electrode assemblies, each separated from the next by a physical separator, and in the presently preferred and illustrated configuration, positioned between end plates as described above, the anolyte end plate having bottom and top channels for anolyte distribution and return, and the cathode end plate having bottom slots for exhaust air venting. The anode faces of the gasketed electrode assembly, as shown in FIGURE 6, face towards the cathode end plate. The gasketed electrode assemblies at each end of the cell stack can, if desired, be shorted to the end plates by interposition of a conductive separator, such as coarse metal screen, shaped to cover the exposed electrode face and fit within the raised borders above the electrode faces formed by the gasketing. Alternatively, physical separators can be used at either end of the cell stack to short the cell stack to the end plates; but unless the end plates are appropriately recessed, a corrugated physical separator like those used in the cell stack will be crushed in by the end plate on the surface facing the end plate.

With a 35 cell electrode stack (one including 35 gasketed bipolar electrode assemblies, with a physical separator between each one), having 3 x 6 inch exposed electrode areas of the above-described configuration, using a 3 M hydrazine in 5 M KOH feed, the presently provided cell will deliver 300 watts or better after deducting 7 watts for powering the motor driving the blower and pump. In the shorted-cell embodiment described, using conductive separators, the power delivered is 12 amperes at 28 volts. For example, the cell will operate a DC drive air blower drawing 11.5 ampers at 28 volts, or it will simultaneously power operation of a spotlight drawing 8-9 amps at 12 volts and a 12-volt drill drawing 10-12 amperes in operation.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. A gasketed electrode assembly comprising
    (1) an assembly of juxtaposed cell elements comprising
        a water-repelling cathode,
        a water-sorbent anode, and
        a water-sorbent separator therebetween; and
    (2) externally coextensive insulating gasketing surrounding and raised above both faces of said assembly, said gasketing on each face comprising
        electrode face borders, and
        hole-pierced extensions protruding outwardly from said borders
    (3) in which the gasketing border on the cathode face surrounds the entire periphery of the cathode face, separating the cathode face from the holes in the extensions, and
        is recessed at intervals
            between two of said extensions,
            and also on a portion of the border which is not between the said two extensions,
            but not between the cathode face and any of the extensions, and
    (4) in which the gasketing border on the anode face covers the anode face edges only between the extensions.

2. The gasketed electrode assembly of claim 1, wherein the assembly of cell elements is substantially rectangular and the gasketing extensions protrude angularly from the four corners of the rectangular assembly.

3. The gasketed assembly of claim 1, wherein the anode face immediately in front of the holes in the extensions of the gasketing is covered by a thin, waterproofing layer of material rising at intervals into ridges of about the same height above the anode face as the surrounding gasketing.

4. The gasketed assembly of claim 2 in which the gasketing is molded onto the electrode assembly.

5. A fuel cell having a cell stack comprising a series of gasketed electrode assemblies as described in claim 1, each separated by a thin metallic separator of the same external dimensions as the gasketing and with holes pierced in the extensions coinciding with the position of the holes in the gasket extensions, the juxtaposition of the metallic separators and the gasketed electrode assemblies forming plenum chambers to which access is available
    to the anode side, from the holes in the extensions, and
        to cathode side by the recesses in the borders of the gasketing.

6. The cell of claim 5, wherein said cell stack is clamped together between
    an anolyte feed and exhaust end plate
        pierced by anolyte feed and exhaust channels having respective external entrance and exit ports for anolyte feed entry and exhaust
        and entry and exit ports from the feed channels aligned with the set of holes in the gasket and separator extensions
    and a cathode vent end plate provided with air porting vents opening from the chamber at the cell stack bottom formed by
        the indented area between the extensions of the electrode assemblies and physical separators,
        and the surface on which said cell stack rests.

References Cited

UNITED STATES PATENTS

| | | | |
|---|---|---|---|
| 3,012,086 | 12/1961 | Vahldieck | 136—86 |
| 3,061,658 | 10/1962 | Blackman | 136—86 |
| 3,188,242 | 6/1965 | Kordesch et al. | 136—86 |
| 3,202,546 | 8/1965 | Rightmire et al. | 136—86 |
| 3,278,336 | 10/1966 | Uline et al. | 136—86 |

ALLEN B. CURTIS, *Primary Examiner.*